(12) United States Patent
Friedrich et al.

(10) Patent No.: US 7,446,314 B2
(45) Date of Patent: Nov. 4, 2008

(54) SUPERCONDUCTING GAMMA AND FAST-NEUTRON SPECTROMETERS WITH HIGH ENERGY RESOLUTION

(75) Inventors: Stephan Friedrich, San Jose, CA (US); Thomas R. Niedermayr, Oakland, CA (US); Simon E. Labov, Berkeley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 11/240,675

(22) Filed: Sep. 30, 2005

(65) Prior Publication Data

US 2007/0075245 A1    Apr. 5, 2007

(51) Int. Cl.
*H01L 27/18* (2006.01)
(52) U.S. Cl. .................................. 250/336.2
(58) Field of Classification Search ............. 250/336.2
See application file for complete search history.

(56) References Cited

U.S. PATENT DOCUMENTS

| | | | |
|---|---|---|---|
| 5,028,786 A * | 7/1991 | Da Silva et al. | 250/336.2 |
| 5,097,128 A * | 3/1992 | Jack | 250/336.2 |
| 5,389,792 A * | 2/1995 | DiMarzio et al. | 250/370.06 |
| 5,880,468 A * | 3/1999 | Irwin et al. | 250/336.2 |
| 6,211,519 B1 * | 4/2001 | Nam et al. | 250/336.2 |
| 6,316,770 B1 * | 11/2001 | Ouvrier-Buffet et al. | 250/338.1 |
| 6,365,912 B1 * | 4/2002 | Booth et al. | 257/39 |
| 2004/0011960 A1* | 1/2004 | Morooka et al. | 250/336.1 |

* cited by examiner

*Primary Examiner*—Constantine Hannaher
*Assistant Examiner*—Marcus H Taningco
(74) *Attorney, Agent, or Firm*—John P. Wooldridge; John H. Lee

(57) ABSTRACT

Superconducting Gamma-ray and fast-neutron spectrometers with very high energy resolution operated at very low temperatures are provided. The sensor consists of a bulk absorber and a superconducting thermometer weakly coupled to a cold reservoir, and determines the energy of the incident particle from the rise in temperature upon absorption. A superconducting film operated at the transition between its superconducting and its normal state is used as the thermometer, and sensor operation at reservoir temperatures around 0.1 K reduces thermal fluctuations and thus enables very high energy resolution. Depending on the choice of absorber material, the spectrometer can be configured either as a Gamma-spectrometer or as a fast-neutron spectrometer.

24 Claims, 3 Drawing Sheets

SUPERCONDUCTING GAMMA AND FAST-NEUTRON SPECTROMETERS WITH HIGH ENERGY RESOLUTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates techniques for assaying nuclear materials, and more specifically, it relates to Gamma- and neutron-spectroscopy.

2. Description of Related Art

Gamma- and neutron-spectroscopy are powerful techniques widely used to determine the composition of nuclear materials non-destructively. Gamma-spectroscopy relates the measured intensity of characteristic gamma-rays from radioactive decay to the concentration and the ratio of gamma-emitting isotopes in the sample. The precision of isotope ratio measurements typically increases when based on intense gamma-lines with similar energies, because variations in detection efficiency and matrix effects are reduced. High-purity Ge detectors with (moderately) high energy resolution are therefore used widely, and several analysis routines (such as Multi-Group Analysis, MGA) have been developed for non-destructive evaluation of isotope ratios with Ge detectors.

Neutron-spectroscopy is currently not as common as Gamma-spectroscopy, primarily because high-resolution neutron spectrometers are either very large and have low detection efficiency (e.g., time-of-flight spectrometers), or have complicated response functions (e.g., $^3$He-based systems). Neutron spectroscopy offers the advantage to also detect non-radioactive substances embedded in a nuclear matrix, to detect nuclear materials through centimeters of shielding, and to identify the shielding material. This information can be extracted from characteristic features in the neutron spectra related to nuclear scattering resonances, and high energy-resolution detectors are required to detect the narrow resonances in the ~MeV range.

Cryogenic detectors are a novel class of sensor technologies operating at temperatures below ~1 K that are currently being developed by several institutions for high-resolution spectroscopy, mostly focusing on X-ray analysis. The Advanced Detector Group at LLNL is developing cryogenic detectors for high-resolution Gamma- and neutron spectroscopy. Earlier work was based on different sensor technologies such as superconducting tunnel junctions (Netel et al.), gallium- or neutron-transmutation-doped germanium (Marcillac et al., Silver et al.) or silicon thermistors (Bleile, Egelhof et al.). These technologies have so far not met the requirements for high energy resolution, efficiency and count rate required for sensitive nuclear analysis. For detector designs based on tunnel junctions the charge transport from the absorber to the sensor was to inefficient, and for semiconductor thermistor technologies either energy resolution or efficiency or maximum count rates are too low.

SUMMARY OF THE INVENTION

It is an object of the present invention to provide a sensor for detecting gamma rays and neutron particles.

It is another object of the invention to provide a method of detecting gamma rays and neutron particle.

These and other objects will be apparent to those skilled in the art from the disclosure herein.

Superconducting Gamma-ray and fast-neutron spectrometers with very high energy resolution operated at very low temperatures are provided. The sensor consists of a bulk absorber and a superconducting thermometer, weakly coupled to a cold reservoir. It determines the energy of the incident particle from the rise in temperature upon absorption. A superconducting film operated at the transition between its superconducting and its normal state, also known as a transition-edge sensor (TES) is used as the thermometer. Sensor operation at temperatures around 0.1 K reduces thermal fluctuations and thus enables very high energy resolution. Depending on the choice of absorber material, the spectrometer can be configured either as a Gamma-spectrometer or as a fast-neutron spectrometer. For Gamma-spectrometry, the absorber consists of a superconducting material such as tin, and for fast-neutron spectroscopy, an insulating absorber crystal with high (n,alpha) absorption cross section such as $^6$LiF or $^{10}$B is used. In addition to offering very high energy resolution, calorimetric fast-neutron spectrometers are compact, provide easy discrimination against Gamma and neutron scattering events, and have a simple response function.

The invention has applications in precision analysis of nuclear materials, for example in non-proliferation or arms control, alloy and impurity characterization and for nuclear waste disposal Other applications include high-energy X-ray and Gamma-ray astronomy.

BRIEF DESCRIPTION OF THE DRAWINGS

The accompanying drawings, which are incorporated into and form part of this disclosure, illustrate embodiments of the invention and together with the description, serve to explain the principles of the invention.

DETAILED DESCRIPTION OF THE INVENTION

Figure 1:
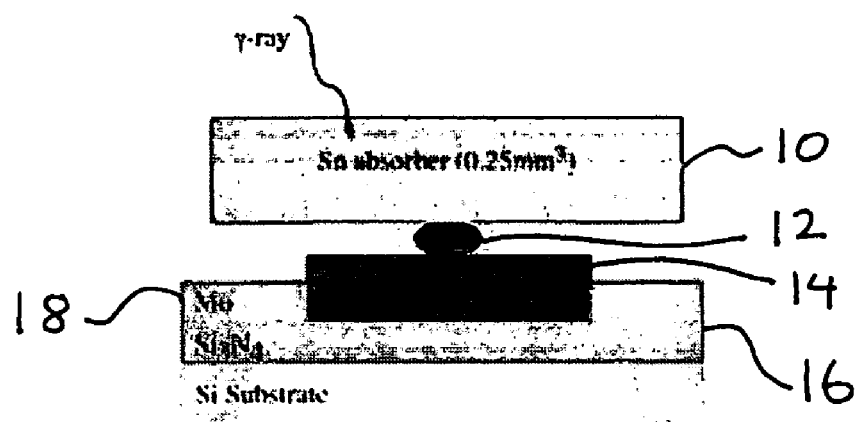
FIG. 1 shows an embodiment of the present gamma detector.
Figure 2:
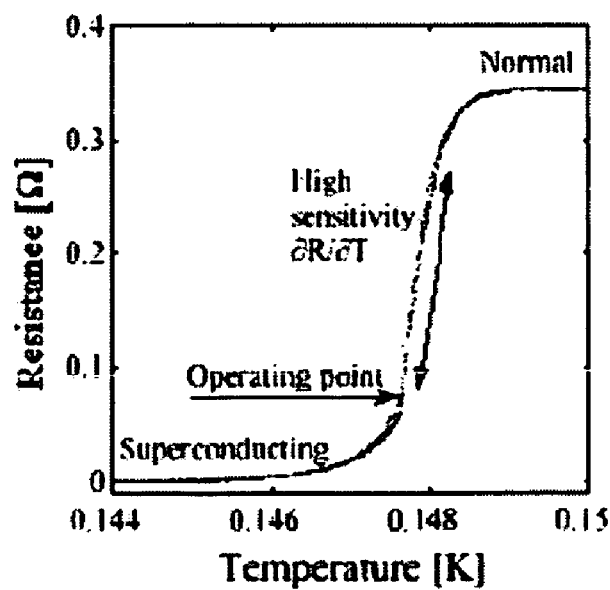
FIG. 2 shows the thermometer temperature operating point for the gamma detector of FIG. 1.
Figure 3:
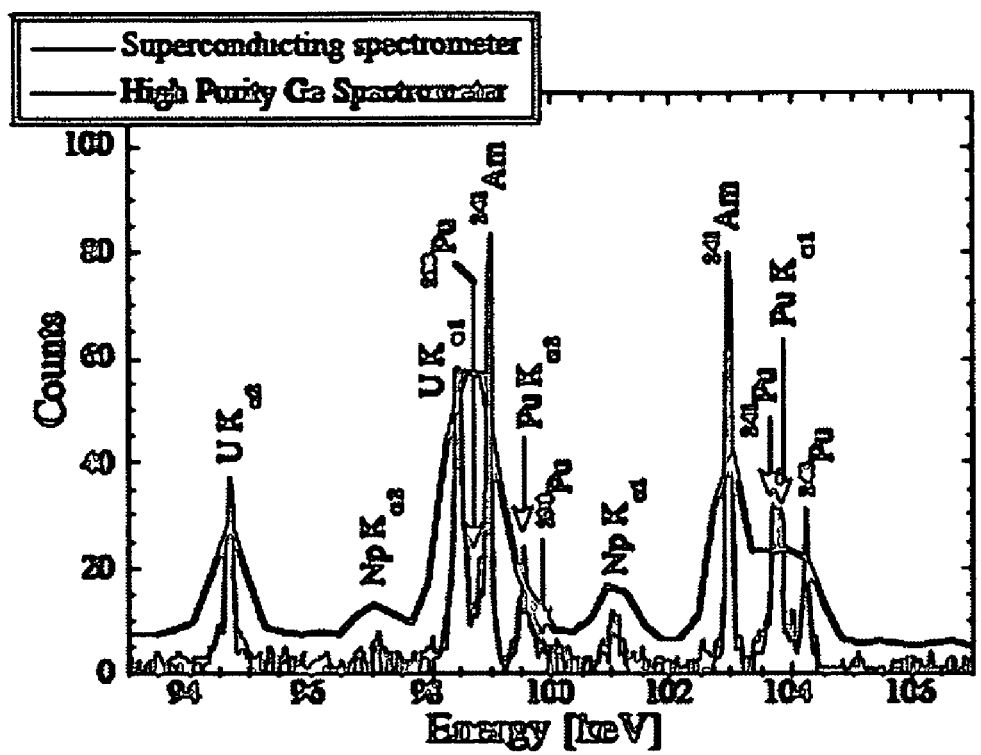
FIG. 3 shows the response of the gamma detector of FIG. 1 to a mixed-isotope Pu source.

The present invention enables cryogenic Gamma and neutron spectrometers based on superconducting transition edge sensors (TESs) coupled to bulk absorbers. Referring to FIG. 1, an embodiment of the gamma detector design consists of 0.25-mm-thick tin foil absorber 10 attached with glue 12 to a Mo/Cu multilayer TES 14 on a thin silicon nitride (SiN) membrane 16. In the particular embodiment shown, the TES is contacted electrically with molybdenum leads 18. FIG. 2 shows the thermometer temperature operating point. The TES is operated at the temperature of the superconducting transition where its resistance changes rapidly with temperature, thereby providing high sensitivity for measuring temperature variations. Gamma-ray absorption increases the temperature of the tin foil in proportion to the gamma-ray energy, and this increase is measured as a change in resistance of the superconducting Mo/Cu TES, before both absorber and TES cool back down to the base temperature through the weak thermal link provided by the SiN membrane. High absorption efficiency is provided by the Sn absorber, and high energy resolution $E_{FWHM}$=2.355 $(k_B T^2 C_{abs})^{1/2}$ is due to the low operating temperature of the sensor of T=0.1 K ($k_B$=Boltzmann constant, $C_{abs}$=heat capacity of the absorber).

While the above described detector design uses a Mo/Cu multilayer TES with a transition temperature of 0.1 K, other superconducting mono-, bi- or multilayer with a resistive transition at the appropriate temperature and with the appropriate sensitivity could be used as well. The absorber in a present invention embodiment TES Gamma-detector consists of a 0.25-mm-thick tin foil, for which an energy resolution below 100 eV at 100 keV has been achieved, but other superconducting or insulating absorbers with low heat capacity and uniform thermalization properties could be used as well. The Gamma-absorber is glued to the Mo/Cu TES with 2870 Stycast epoxy, but other epoxies and bonding mechanisms such as bump-bonding, could be used as well.

Figure 5:
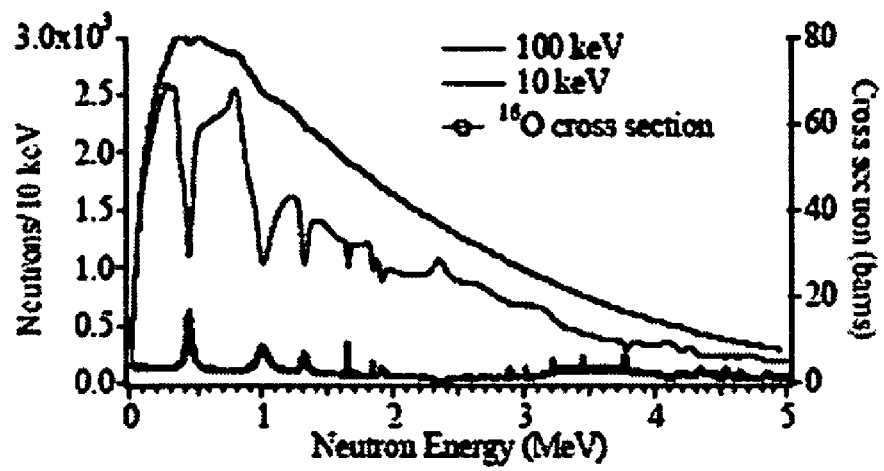
FIG. 5 shows a MCNP simulation of the neutron spectra of $PuO_2$ for different instrumental energy resolution.

The second part of the invention concerns the adaptation of TES-spectrometers to high-resolution fast-neutron spectrometry. Calorimetric fast-neutron spectroscopy based on exothermic (n, alpha) reactions is an alternative method to conventional approaches like time-of-flight, $^3$He ionization chambers or proton-recoil proportional counters. Fast neutrons with kinetic energy $E_n$ deposit a total energy $E_{total}$=$E_n$+ $Q_{reaction}$ in an absorber crystal. If $E_{total}$ is distributed among the reaction products with stopping ranges of a few microns, $E_{total}$ can be measured from the rise in absorber temperature with a superconducting TES. This method offers high energy resolution, a simple response function and easy gamma-ray discrimination. This is, for example, crucial to identify of light-element inclusions like C, F or O in an actinide matrix such as U and Pu from the unique elemental signatures due to neutron scattering and absorption resonances in the MeV energy range. These measurements require high energy resolution to detect the narrow resonances, which can be achieved at operating temperatures of ~0.1 K (FIG. 5).

Figure 4:
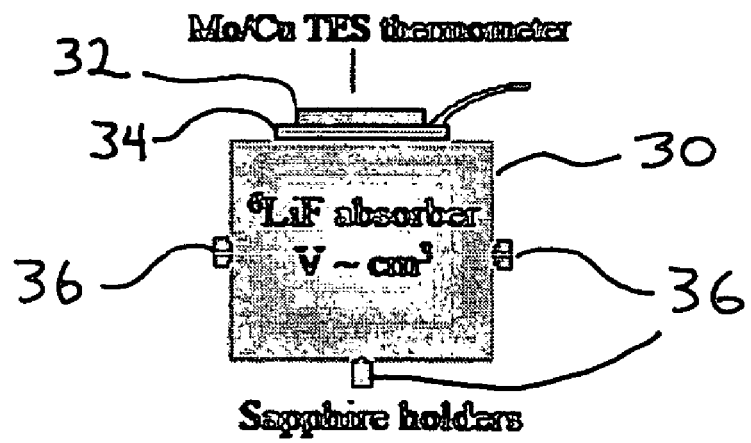
FIG. 4 shows an embodiment of the present neutron detector.
Figure 6:
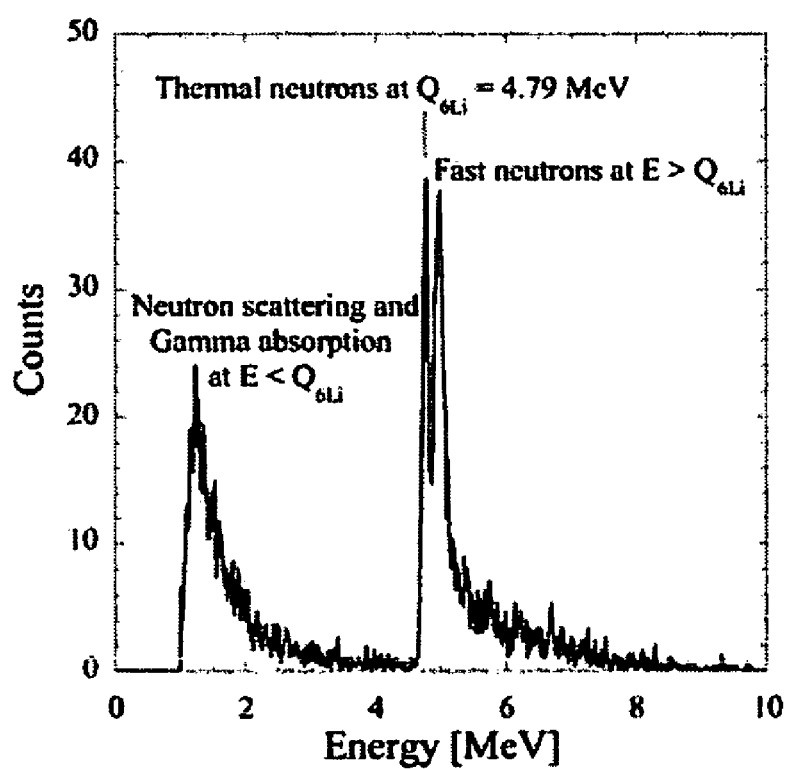
FIG. 6 shows the response of a neutron detector of FIG. 4 to a 252 Cf fast-neutron source.

FIG. 4 shows a present invention embodiment of the neutron detector that uses a 94%-enriched $^6$LiF single crystal 30 as a fast-neutron absorber, and also reads out the subsequent rise in temperature with a Mo/Cu multilayer TES 32 on a Si substrate 34 that is glued to the absorber crystal with varnish. The crystal is held with sapphire holders 36. This neutron spectrometer operates by absorbing fast-neutrons with energy $E_n$ with high efficiency through the $^6$Li(n,alpha)$^3$He capture reaction, thereby depositing the total energy of $Q_{6Li}$+ $E_n$ in the $^6$LiF crystal, where $Q_{6Li}$=4.79 MeV is the Q-value of the reaction. High absorption efficiency is based on the high neutron capture cross section in $^6$LiF and on the high level of enrichment Good discrimination of the capture signals from gamma-and neutron scattering events is due to the fact that only the capture signals deposit the Q value of energy, and are thus shifted from gamma-and neutron scattering events in the spectrum by 4.79 MeV for capture in $^6$LiF. The high energy resolution is based on the low operating temperature T≈0.1 K, which produces a very high energy resolution $E_{FWHM}$=2.355 $(k_B T^2 C_{abs})^{1/2}$. The present inventors have achieved an energy resolution of 70 keV FWHM with such devices, and further improvement by an order of magnitude are possible. FIG. 6 shows the response of such a detector to a 252 Cf fast-neutron source. Moderately high count rates on the order of ~100 cts/s per pixel are due to the pulse decay time of ~1 ms due to moderately good thermal coupling between the $^6$LiF absortber, the Si chip with the Mo/Cu TES, and the cold bath at 0.1 K (Hau et al., 2005).

As in the case for gamma-detectors, other absorbers could be substituted for $^6$LiF, although the requirements of high (n, alpha) absorption cross section and short stopping range of the reaction products limits the choices to $^6$Li- and $^{10}$B-based materials. Also, other epoxies and bonding mechanisms between absorber and sensor, and other superconducting mono-, bi- or multilayer TESs with a resistive transition at the appropriate temperature and with the appropriate sensitivity could be used.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A sensor, comprising;
   a bulk absorber;
   a superconducting film in contact with said bulk absorber, wherein said superconducting film comprises a superconducting transition edge sensor (TES);
   means for operating said superconducting film at an operating temperature that is between its superconducting state and its normal state; and
   a cold bath and a silicon nitride membrane providing a weak thermal link between said TES and said cold bath.

2. The sensor of claim 1, wherein said bulk absorber is operated at a first temperature, wherein a gamma ray or a neutron particle absorbed by said absorber will produce a rise in temperature in said absorber to produce a second temperature, said sensor further comprising means for calculating the energy of said gamma ray or said neutron particle from said second temperature.

3. The sensor of claim 1, wherein said operating temperature is about 0.1 K.

4. The sensor of claim 1, wherein said absorber comprises superconducting material.

5. The sensor of claim 1, wherein said absorber comprises insulating material.

6. The sensor of claim 1, wherein said absorber comprises material selected from the group consisting of tin, Ta and Pb.

7. The sensor of claim 1, wherein said TES comprises at least one bilayer of Mo/Cu.

8. The sensor of claim 1, wherein said absorber comprises an insulating absorber crystal with a high (n,alpha) absorption cross section.

9. The sensor of claim 8, wherein said crystal comprises $^6$LiF.

10. The sensor of claim 8, wherein said crystal comprises a $^6$Li-based material.

11. The sensor of claim 8, wherein said crystal comprises $^{10}$B.

12. The sensor of claim 8, wherein said crystal comprises a $^{10}$B-based material.

13. A method of detecting gamma rays, comprising;
   providing a bulk absorber characterized by a first temperature;

contacting a superconducting film to said bulk absorber, wherein said superconducting film comprises a superconducting transition edge sensor (TES);

providing a weak thermal link with a silicon nitride membrane connected between said TES and a cold bath; and operating said superconducting film at an operating temperature that is between its superconducting state and its normal state, wherein a gamma ray or a neutron particle absorbed by said absorber will produce a temperature rise in said absorber to produce a second temperature.

14. The method of claim 13, further comprising calculating the energy of said gamma ray or said neutron particle from the difference between said first temperature and said second temperature.

15. The method of claim 13, wherein said operating temperature is set to about 0.1 K.

16. The method of claim 13, wherein said absorber comprises superconducting material.

17. The method of claim 13, wherein said absorber comprises insulating material.

18. The method of claim 13, wherein said absorber comprises a material selected from the group consisting of tin, Ta and Pb.

19. The method of claim 13, wherein said TES comprises at least one Mo/Cu bilayer.

20. The method of claim 13, wherein said absorber comprises an insulating absorber crystal with a high (n,alpha) absorption cross section.

21. The method of claim 20, wherein said crystal comprises $^6$LiF.

22. The method of claim 20, wherein said crystal comprises a $^6$Li-based material.

23. The method of claim 20, wherein said crystal comprises $^{10}$B.

24. The method of claim 20, wherein said crystal comprises a $^{10}$B-based material.

* * * * *